United States Patent [19]

Koike

[11] Patent Number: 4,805,309

[45] Date of Patent: Feb. 21, 1989

[54] GAUGE FOR MONITORING THE DIMENSIONS OF A STRUCTURAL MEMBER

[75] Inventor: Hideo Koike, Milwaukee, Wis.

[73] Assignee: A. O. Smith Corporation, Milwaukee, Wis.

[21] Appl. No.: 151,107

[22] Filed: Feb. 1, 1988

[51] Int. Cl.$^4$ .................. G01B 5/04; G01B 5/14; G01B 5/24

[52] U.S. Cl. ............... 33/147 L; 33/147 K; 33/534; 33/542

[58] Field of Search ............ 33/144, 146, 147 L, 33/147 K, 147 R, 164 C, 534, 535, 542, 548, 551-558

[56] References Cited

U.S. PATENT DOCUMENTS

| | | | |
|---|---|---|---|
| 2,803,063 | 8/1957 | Scholtz | 33/144 |
| 3,065,415 | 11/1962 | Slamar | 33/147 L |
| 3,562,918 | 2/1971 | Ertman et al. | 33/558 |
| 4,228,594 | 10/1980 | Shlager | 33/125 R |
| 4,651,437 | 3/1987 | Al-Khouly | 33/147 K |

Primary Examiner—William A. Cuchlinski, Jr.
Assistant Examiner—Patrick R. Scanlon
Attorney, Agent, or Firm—Andrus, Sceales, Starke & Sawall

[57] ABSTRACT

A gauge for travel along and continuous monitoring of deviations in the dimensions of a structural channel member or the like includes a wheeled carriage which carries individual gauges for tracking and monitoring deviations in the web width, flange angle and flange height of the member as the carriage moves therealong. The gauge is adjustable for use on members having different nominal web width and flange height dimensions.

10 Claims, 4 Drawing Sheets

4,805,309

GAUGE FOR MONITORING THE DIMENSIONS OF A STRUCTURAL MEMBER

BACKGROUND OF THE INVENTION

The present invention relates to a gauge for monitoring deviations in standard dimensions of a structural member along its length and, more particularly, to a gauge useful in simultaneously monitoring the deviations in several separate dimensions of a structural member of the type having a center web and integral side flanges.

Structural members, whether formed continuously as by rolling or individually as by stamping or forging, require a continuous checking or monitoring of various dimensions. Such monitoring may be required to set and maintain the positions of the forming dies, to check the final dimensions of the formed structural member, or to recheck the dimensions after further processing such as heat treatment. One such apparatus for the continuous monitoring of a hot-rolled wide flange beam is shown in U.S. Pat. No. 3,562,918. In accordance with the teaching of this patent, a conveyor system carries a hot structural member into the apparatus where a number of positioning actuators move monitoring probes into position to measure various dimensions on the moving member. The probes are not direct reading and signals therefrom are fed via transducers and related electronic circuitry to provide readouts of the dimensions.

Other structural members, such as channel sections, may be alternately formed by cold forming in the die set of a press brake. Some large channel members may be as long as 40 feet and require forming dies which are made in longitudinal sections and must be individually set and adjusted in the press brake for accurate formation of the channel member. For example, a 40 foot channel member may utilize a ten piece die, each section of which is four feet long. Setting such a multiple-piece die in the press brake to form a 40 foot member of uniform shape and proper dimensions has been a tedious and time consuming process. Typically, the die pieces are set preliminarily, a flat piece of stock is formed to a channel section, the channel is then inspected and its dimensions measured, and the dies reset as required. Measurements are made with a variety of devices, including paddle gauges shaped to the cross section of the channel as well as conventional scales, squares and calipers. In particular, a paddle gauge is a "go-no go" device and provides no actual measured dimensions to assist in setting or resetting the dies. The dimensions typically measured and monitored include the width of the web (inside flange-to-flange distance), the height of the flanges, and the perpendicularity of the flanges to the web. It is also often desirable or necessary for quality control purposes to check the dimensions of a member after further processing, such as heat treating, to make sure no critical dimension has drited from the nominal and out of tolerance.

SUMMARY OF THE INVENTION

In accordance with the present invention, a multiple function gauge is adapted to travel on a wheeled carriage along the web of a channel member (or similar structural member) and provide a continuous indication of the magnitude of deviation in key dimensions from the nominal or standard dimensions. In particular, the gauge continuously and simultaneously monitors web width, flange height, and perpendicularity (or deviations therefrom) between the web and flanges.

The wheeled carriage includes a laterally adjustable base which may be set to the width of the web (flange-to-flange width) with horizontally disposed reference and width racking wheels bearing against the opposite inside faces of the flanges, the width tracking wheel being spring-biased for movement perpendicular to the flange in response to variations in the actual flange-to-flange width. Lateral movement of the width tracking wheel is translated by a width deviation indication means into a continuous indication of the magnitude of the width deviation from the nominal or standard width dimension as the carriage moves along the member.

The gauge also includes an angle tracking apparatus which is disposed in spring-biased engagement with the inside face of one flange for movement in response to variations in the actual angle (perpendicularity) between the flange face and the web. Such variations are translated into a continuous indication of the magnitude of the deviation by an angle deviation indication means operatively connected to the angle tracking apparatus.

The gauge further includes a flange height indicator assembly which comprises a flange height follower adapted to bear on the upper edge of one flange and to move vertically with respect to the carriage in response to variations in the actual flange height. Such variations are translated by an operatively connected flange height deviation indication means to provide a continuous indication of the magnitude of the flange height deviation from the nominal or standard flange height as the carriage moves along the member.

Each of the three means for providing a continuous indication of deviation in the measured dimensions (i.e. web width, flange height, and perpendicularity) includes a direct reading dial or scale, and the initial web width and flange height dimensions may be initially set through the use of supplemental direct reading scales.

DETAILED DESCRIPTION OF THE PREFERRED EMBODIMENT

Figure 1:
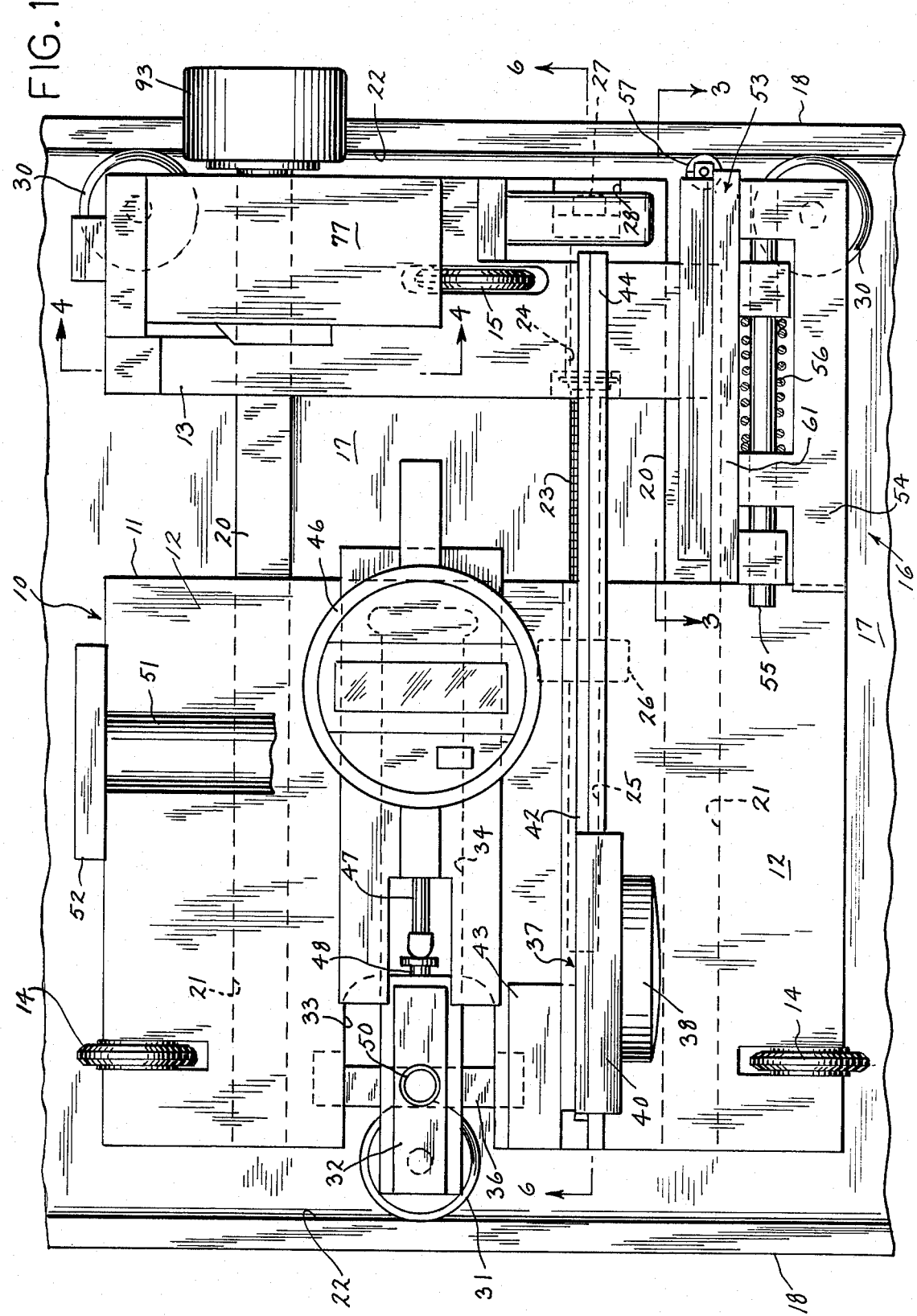
FIG. 1 is a top plan view of the gauge of the present invention shown in its operative position in a structural channel member.
Figure 2:
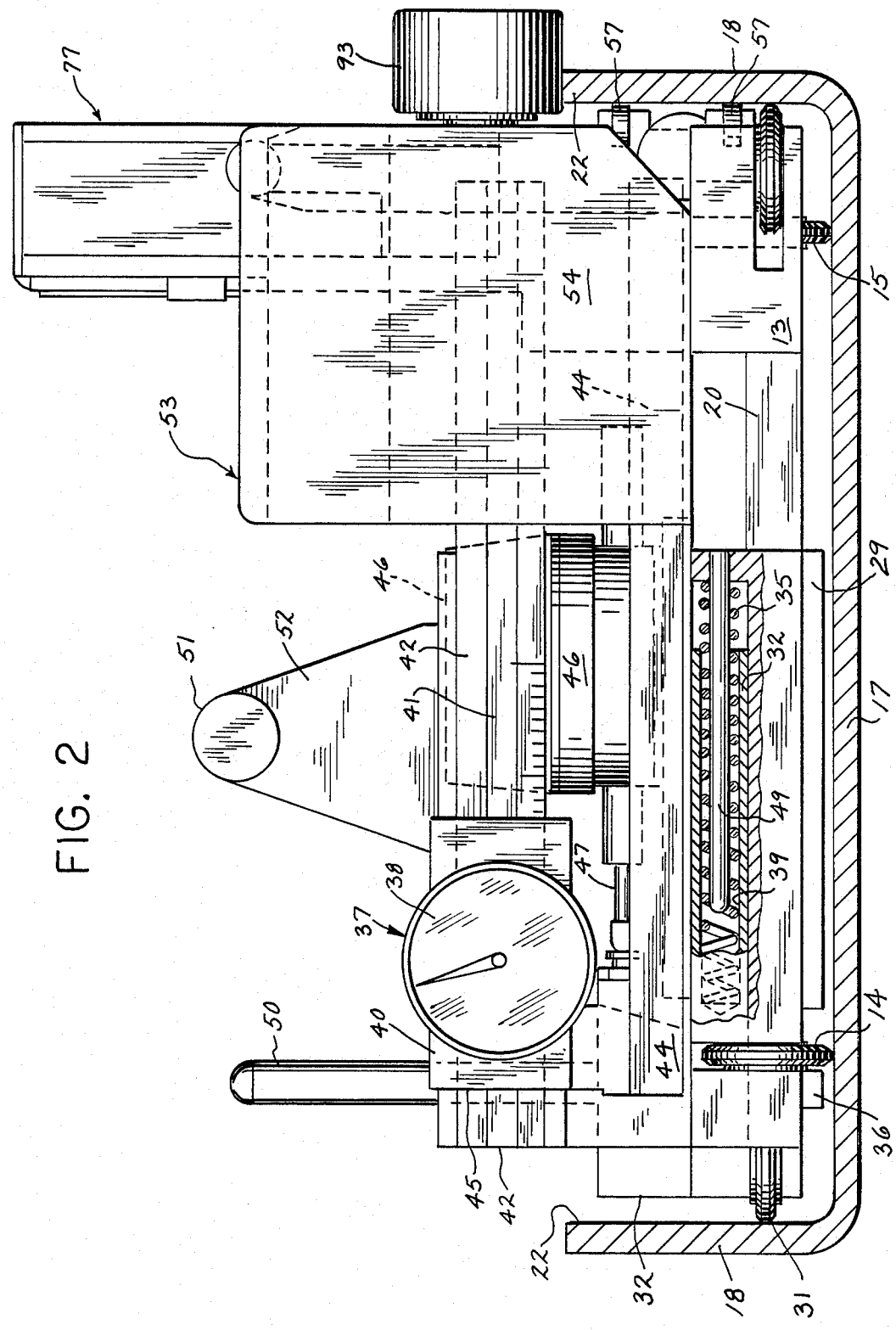
FIG. 2 is a front elevation of the gauge shown in FIG. 1 with certain parts broken away for clarity and with the channel member shown in section.

Referring particularly to FIGS. 1 and 2, a gauge 10 includes a wheeled carriage 11 comprised of a large base member 12 and a small base member 13. The large base member 12 includes a pair of longitudinally spaced supporting wheels 14 and the small base member 13 has a centrally located supporting wheel 15. The base members 12 and 13 are interconnected with a pair of slide bars 20. The slide bars 20 are preferably fixed to the small base member 13 and slidable within slide recesses 21 disposed in the lower portion of the large base member 12, such that the distance between the base members may be varied and the width of the gauge 10 selected to correspond to the width of the structural member being gauged, as will be described in more detail below.

The gauge 10 is adapted to ride on its supporting wheels 14 and 15 within a structural channel member 16. In particular, the wheels 14 and 15 ride on the central web 17 of the channel member and the carriage 11 is disposed between the lateral flanges 18 extending upwardly at right angles from the web 17. As the gauge carriage 11 travels along the channel member 16, three key dimensions of the member are continuously monitored and deviations from the nominal or standard dimension are indicated on separate gauges. The key dimensions monitored are the web width, the flange angle or perpendicularity with respect to the web, and the flange height.

Figure 6:
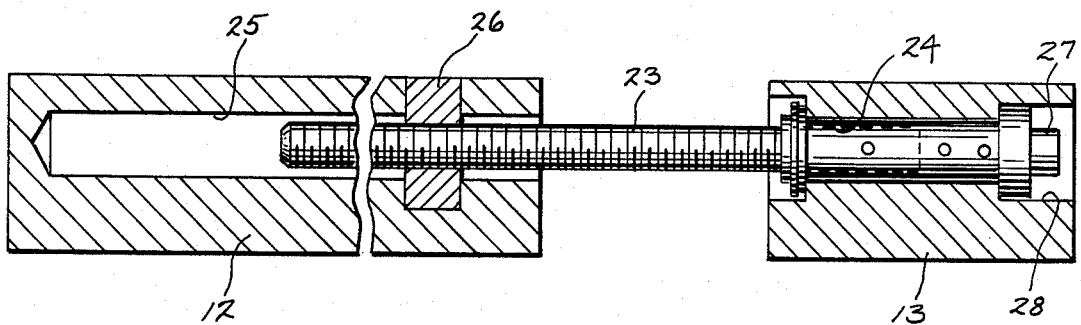
FIG. 6 is a vertical section taken on line 6-6 of FIG. 1 showing details of the gauge width adjusting screw assembly.

The gauge is initially set for use by adjusting the width to correspond to the nominal or standard web width, i.e. distance between the inside faces 22 of the flanges 18. The small base member 13 and attached slide bars 20 are moved laterally with respect to the large base member 12 by an adjusting screw 23. Referring also to FIG. 6, the adjusting screw is captured and journalled for rotation within a through bore 24 in the small base member 13. The opposite end of the adjusting screw 23 extends laterally into a counterbore 25 in the large base member 12 and is threaded to engage a captive nut 26 in the counter bore 25. The head 27 of the adjusting screw 23 is accessible through the open end 28 in the through bore 24 of the small base member 13. The head 27 of the adjusting screw 23 is conveniently provided with means for engagement by a tool for rotation to move the base members 12 and 13 laterally relative to one another. The selected width between the base members may be fixed and held by bringing a slide bar clamp 29, adjustably attached to the underside of the large base member 12, into clamping engagement with the slide bar 20.

To provide the capability for tracking and monitoring deviations in the web width (flange-to-flange distance), the carriage 11 is provided with horizontally disposed flange-engaging wheels. More particularly, the small base member 13 includes a pair of horizontally disposed reference wheels 30 which extend beyond the lateral edge of the small base member and are adapted to bear against and roll along the inside face 22 of one flange 18. A single horizontally disposed width tracking wheel 31 is centrally attached to the opposite lateral edge of the large base member 12 and extends slightly beyond for rolling engagement with the inside face of the other flange.

To provide the ability to track and monitor web width variations as the carriage moves along the channel member 16, the width tracking wheel 31 is mounted to the base member 12 for spring-biased reciprocal movement perpendicular to the flange. The width tracking wheel 31 is attached to rotate on its axis in a slide bracket 32. The slide bracket 32 extends into a U-shaped recess 33 in the large base member 12 and into a slide channel 34 in the base member and within which the slide bracket 32 may move in either lateral direction. As is best shown in Fig. 2, a horizontal blind bore 39 in the slide bracket 32 is adapted to receive a stabilizing rod 49 rigidly attached to the large base member. A compression spring 35 is inserted over the stabilizing rod 49 and into the bore 39 to bias the slide bracket 32 and width tracking wheel laterally into engagement with the flange 18. A stop 36 extends across the U-shaped recess 33 below the slide bracket 32 to limit the extent to which the bracket and attached width indicator wheel 31 may extend under the influence of the compression spring 35.

To establsh the nominal or standard web width dimension, a modified dial caliper 37 is mounted to the carriage between the large and small base members 12 and 13. The caliper 37 includes a conventional outer slide member 42 containing a linear scale and which is attached at one end by a mounting base 43 to the large base member 12 of the carriage. The caliper also includes a unitary assembly of a dial 38, a single jaw 40, and a center slide 41, all of which are adapted for sliding movement within and relative to the outer slide 42 by the attachment of the lower end of the jaw 40 to the small base member 13 via a connecting beam 44. Thus, lateral adjustment of the width of the carriage 11, by turning adjusting screw 23, will result in relative corresponding movement between the caliper jaw 40 and the outer slide 42 of the caliper. The caliper jaw includes a scale indicator edge 45 by which the rough setting of the width dimension may be read on the linear scale, with the fine width dimension read in a conventional manner on the dial 38.

The dial caliper 37 and the width tracking wheel 31 (including its slide bracket 32) are calibrated such that movement of the wheel and slide along the slide channel 34 to a roughly intermediate position of the range of travel will locate the outer edge of the width tracking wheel 31 at a lateral distance from the oppositely disposed reference wheels 30 which is exactly equal to the caliper setting. Such calibration may be carried out in a number of different ways which are not necessary for a complete understanding of the invention. It is necessary, however, to briefly explain the function of the device employed to provide a continuous indication of any deviation from the nominal or standard width as the carriage travels along the length of the channel member. A linear displacement indicator 46 is attached to the top of the large base member 12. The displacement indicator includes a spring-loaded indicator plunger 47 which is adapted to engage an abutment 48 on the slide bracket 32. One type of linear displacement indicator which has been found to be suitable is a Mitutoyo Digimatic indicator model No. 543-162.

After the width tracking wheel assembly 31 and 32 and the linear displacement indicator 46 are appropriately calibrated with respect to the dial caliper 37 (and the displacement indicator properly "zeroed"), the linear displacement indicator will give a reading of zero when the lateral distance from the outside edge of the width tracking wheel 31 to the outside edges of the reference wheels 30 equals the width dimension set on the caliper 37. Thus, if the carriage is set within a channel member as shown in FIGS. 1 and 2, with the tracking wheel 31 and reference wheels 30 bearing, respectively, against the opposite inside faces 22 of the flanges 18, the linear displacement indicator 46 will read zero only if the actual lateral distance between the flange faces (also called the web width) equals the set gauge width. Any deviation from that width, as the gauge is rolled along the channel web, will result in lateral movement of the width tracking wheel 31 and corresponding movement of the indicator plunger 47, resulting in the continuous and direct indication of the magnitude and direction of the web width deviation.

Because the compression spring 35 which biases the slide bracket 32 for its reciprocal sliding movement requires a rather high compressive force for displacement, a vertical post 50 is rigidly attached to and extends upwardly from the slide bracket 32 to assist in manually moving the tracking wheel 31 assembly laterally inward as the gauge is set into a channel member 16. The carriage also conveniently includes a horizontally disposed carrying handle 51 which may be conveniently attached to the large base member 12 by an intermediate handle support bracket 52.

Figure 3:
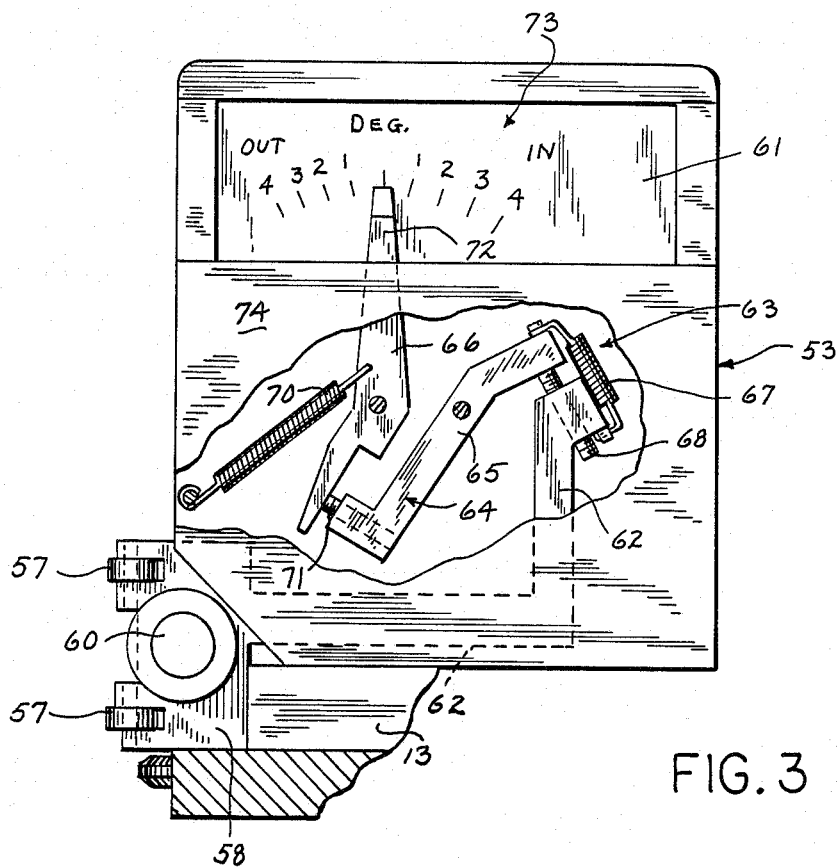
FIG. 3 is an elevation view of the flange angle tracking and angle deviation indication assembly taken generally on line 3—3 of FIG. 1.

To monitor the perpendicularity of the flanges 18 to the web 17, the gauge 10 also includes an angle tracking and angle deviation indication assembly 53. Referring also to FIG. 3, the assembly 53 is preferably self-contained and adapted to be mounted directly atop the small base member 13 by means of a mounting bracket 54. As may best be seen in FIG. 1, the angle tracking-/deviation assembly 53 is mounted to slide laterally with respect to the mounting bracket on a bracket pin 55. A coil spring 56 is mounted on the pin 55 to bias the assembly laterally outwardly wth respect to the base member 13.

A pair of vertically spaced and horizontally disposed angle tracking rollers 57 are mounted on a yoke member 58 and are adapted to engage the inside face 22 of a flange 18 under the biasing influence of coil spring 56. The yoke member 58 is attached by a pivot pin 60 to the assembly base plate 61 such that, in its mounted position, the yoke may pivot about the axis of the pin which is disposed on a horizontal axis parallel to the flange face. Any deviation in the angle of the flange with respect to the base, as the carriage travels along the channel, will cause relative lateral movement of the tracking rollers 57 and a pivoting of the yoke 58 about its pivot pin 60. The yoke member 58 includes an integral L-shaped arm 62 which extends inwardly of the assembly to provide operative connection to the angle deviation indication means 63. The deviation indication means includes a folded lever assembly 64, the construction and operation of which provides a desirable large output resolution in a relatively short lever arm length. The folded lever assembly 64 includes a first lever arm 65 and a second lever arm 66 each pivotally attached to the base plate 61. A first tension spring 67 interconnects the end of the L-shaped arm 62 of the yoke and one end of the first lever arm 65. A second tension spring 70 biases one end of the second lever arm 66 against the other end of the first lever arm 65. A pair of adjusting screws 68 and 71 provide the necessary adjustment to zero the pointer 72 located on the upper end of the second lever arm 66. An angle deviation scale 73 may be conveniently calibrated to read in degrees from perpendicularity. The folded lever assembly 64 is enclosed with a cover plate 74 except for the exposed pointer 72 and the scale 73 on the upper part of the base plate 61. As the yoke 58 pivots in response to a deviation from perpendicularity, the pivotal movement is translated through the lever assembly 64 to a direct reading of the magnitude and direction (in or out) of the deviation.

The third key dimension, the flange height, is tracked by a flange height tracking means 75 and deviations from the nominal or standard height and the magnitude thereof are continuously indicated by a flange height deviation indication means 76. The flange height tracking means 75 and flange height deviation indicatio means 76 compriise a single operatively interconnected flange height indicator assembly 77 which is attached to the small base member 13 adjacent to the flange angle indicator assembly 53. The flange height indicator assembly is attached to the base by a vertical mounting bracket 78 which includes a vertically disposed linear flange height scale 80. An adjustable slide member 81 is mounted for vertical movement along the mounting bracket 78 and includes a height scale indicator 82 and a locking mechanism 83 to set the slide member 81 relative to the mounting bracket 78 at the desired nominal flange height, as will be more fully described hereinafter. Attached to the adjustable slide member 81 is a dial plate 84 to which is pivotally attached a pointer arm 85 on a pointer arm pivot 86. Also attached to the pointer arm pivot on the backside of the dial plate 84 is a pinion 87. A rack 88 is mounted for operative engagement of the pinion 87 by a rack mounting bracket 90 which, in turn, is mounted for vertical movement along a vertical slide pin 91 fixed to the adjustable slide member 81. A compression spring 92 surrounds the slide pin 91 such that its upper end bears against the slide member 81 and its lower end against the rack mounting bracket 90 to bias the latter in a downward vertical direction.

The flange height tracking means 75 includes a cam follower 93 attached to the lower end of the rack mounting bracket 90 to track the flange height as the gauge 10 is moved along the channel member 16.

Figure 4:
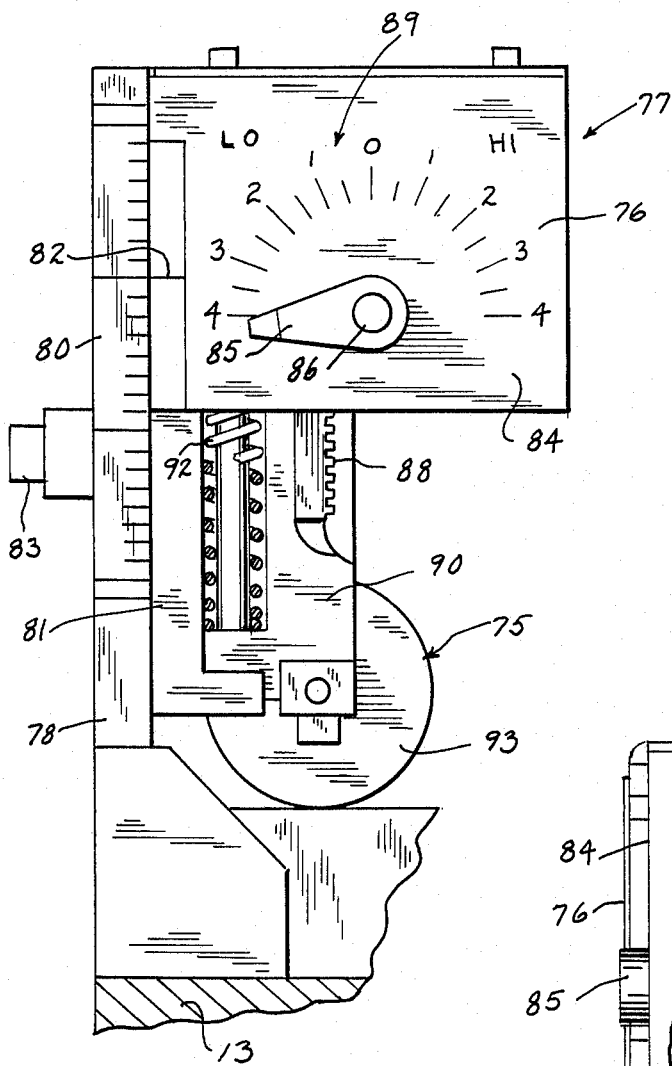
FIG. 4 is an elevation view of the flange height follower and flange height deviation indicator assembly taken generally on line 4-4 of FIG. 1.
Figure 5:
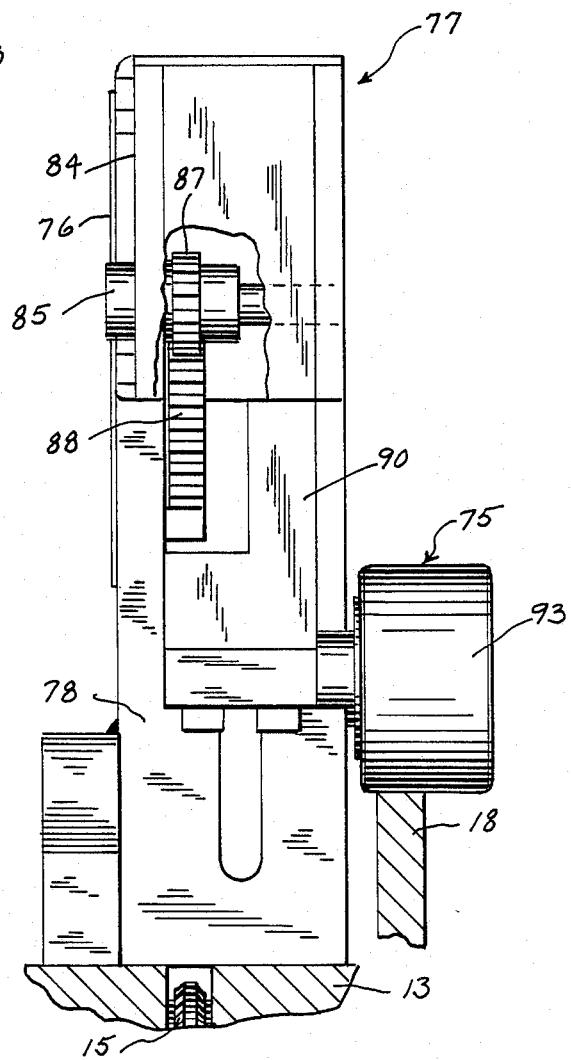
FIG. 5 is a side elevation of the assembly shown in FIG. 4.

To set the flange height indicator assembly 77, the adjustable slide member 81 is positioned so that the attached height scale indicator 82 coincides with a nominal or standard flange height selected on the flange height scale 80. The height is set by tightening the locking mechanism 83. Before the gauge is inserted into the channel and the cam follower 93 brought to bear on the top edge of the flange, the bias force of the compression spring 92 will force the rack mounting bracket to bottom on the adjustable slide member 81, as shown in FIG. 4. However, relative vertical upward movement of the cam follower against the bias force of compression spring 92, as the gauge is placed into the channel and the cam follower engages the top edge of the flange, will cause corresponding vertical movement of the rack 88, rotation of the pinion 87 and clockwise movement of the pointer arm 85. The assembly is calibrated such that when the pointer arm is at the zero position on the height deviation scale 89 on the dial plate 84, the lowermost surface of the cam follower 93 will be exactly at a vertical distance above the web 17 equal to the height of the flange as set on the height scale indicator 82. As the gauge travels along the channel and the cam follower 93, correspondingly, along the top edge of the flange, any deviation in the actual flange height from the nominal or standard height will result in relative vertical movement of the rack 88 which is translated via the operative connection of the pinion 87 and pointer arm 85 into a direct indication of the magnitude of the deviation as well as the direction (high or low).

Various modes of carrying out the present invention are contemplated as being within the scope of the following claims particularly pointing out and distinctly claiming the subject matter which is regarded as the invention.

I claim:

1. A guage apparatus for monitoring deviations in the nominal dimensions of a structural member having a center web and integral flanges extending perpendicular to the web from the lateral edges thereof, the apparatus comprising:
- (a) a wheeled carriage supporting the apparatus for rolling movement on the web and between the flanges along the length of the member;
- (b) web width tracking and width deviation indication means attached to the carriage and in engagement with the flanges for continuously monitoring and providing an indication of the magnitude of deviation in the actual web width from the nominal web width dimension;
- (c) angle tracking and angle deviation indication means attached to the carriage and in engagement with one flange for continuously monitoring and providing an indication of the magnitude of deviations of said flange from perpendicularity with respect to the web;
- (d) flange height tracking and height deviation indication means attached to the carriage and in engagement with the upper edge of one flange for continuously monitoring and providing an indication of the magnitude of deviations in the actual flange height from the nominal flange height; and,
- (e) each of the tracking and deviation indication means of the web width, angle and flange height being operable in response to movement of the carriage along the member.

2. The apparatus as set forth in claim 1 wherein the tracking and deviation indication means of the web width, angle and flange height are each spring-biased into enggement with a flange.

3. The apparatus as set forth in claim 2 wherein the tracking and deviation indication means of the web width and flange height are each independently adjustable for use with structural members having different nominal web width and flange height dimensions, respectively.

4. A gauge apparatus for monitoring deviatons in the dimensions of a structural member having a center web and integral flanges extending perpendicular to the web from the lateral edges thereof, the apparatus comprising:
- (a) a wheeled carriage supporting the apparatus for rolling movement on the web and between the flanges along the length of the member;
- (b said carriage including:
  - (i) a pair of horizontally disposed reference wheels on one side of the base adapted to bear against the inside face of one flange;
  - (ii) a horizontally disposed width tracking wheel on the opposite side of the base adapted to bear against the inside face of the other flange;
  - (iii) said reference wheels and tracking wheel being disposed for rolling movement along the flange faces wih movement of the carriage on the web;
  - (iv) said width tracking wheel being mounted for spring-biased movement perpendicular to the flange in response to variations in the actual inside flange-to-flange width;
- (c) width deviation indication means operatively connected to said width tracking wheel for providing a continuous indication of the magnitude of the deviation in the actual inside width from the nominal width dimension as the carriage moves along the member;
- (d) angle tracking means attached to one side of the carriage disposed in spring-biased engagement with the inside face of one flange for movement in response to variations in the actual angle between said face and the web;
- (e) angle deviation indication means operatively connected to said angle tracking means for providing a continuous indication of the magnitude of the deviation in the actual angle from perpendicularity as the carriage moves along the member;
- (f) flange height tracking means attached to one side of the carriage for relative vertical movement with respect thereto and including a flange follower adapted to bear on the upper edge of one flange for movement in response to variations in the actual vertical distance between the upper edge and the web; and,
- (g) flange height deviation indication means operatively connected to said flange height tracking means for providing a continuous indication of the magnitude of the deviation in the actual vertical distance from the nominal flange height as the carriage moves along the member.

5. The apparatus as set forth in claim 4 wherein the carriage is adjustable laterally to set the width thereof to the nominal inside flange-to-flange width dimension of the member and comprises:
- (a) a pair of base members;
- (b) slide means interconnecting the base members for adjustable lateral movement therebetween;
- (c) a width scale mounted between the base members and responsive to lateral movement therebetween to provide a measurement of the desired nominal inside width dimension; and
- (d) locking means for fixing the base members to set the desired width dimension.

6. The apparatus as set forth in claim 5 wherein the carriage includes a pair of supporting wheels attached to one base member and a single supporting wheel attached to the other base member.

7. The apparatus as set forth in claim 6 wherein the width tracking wheel is attached to said one base member and the reference wheels are attached to said other base member.

8. The apparatus as set forth in claim 4 wherein the width deviation indication means comprises a linear displacement indicator.

9. The apparatus as set forth in claim 4 wherein the angle tracking means comprises:
- (a) a pair of vertically spaced and horizontally disposed rollers;
- (b) a yoke member mounting the rollers for engagement with the flange face and pivotal movement about a horizontal axis parallel to the flange face, and,
- (c) said yoke member providing the operative connection to the angle deviation indication means.

10. The apparatus as set forth in claim 4 wherein the flange follower comprises a flange roller and wherein the flange height deviation indication means further comprises:
- (a) a vertically reciprocable slide mounting the flange roller in spring-biased engagement with the upper edge of the flange;
- (b) a height scale first portion on the slide adapted to operatively engage a height scale second portion attached to the base to provide a measurement of the nominal flange height;
- (c) means for locking the height scale portions at a selected nominal flange height; and,
- (d) a flange height deviation scale operatively attached to the reciprocable slide.

* * * * *

UNITED STATES PATENT AND TRADEMARK OFFICE
CERTIFICATE OF CORRECTION

PATENT NO. : 4,805,309

DATED : February 21, 1989

INVENTOR(S) : Hideo Koike

It is certified that error appears in the above-identified patent and that said Letters Patent is hereby corrected as shown below:

Column 6, claim 1, line 67, change "guage" to --gauge--.

Column 7, claim 2, line 31, change "enggement" to --engagement--.

Column 7, claim 4, line 38, change "deviatons" to --deviations--.

Column 7, claim 4, line 55, change "wih" to --with--.

Column 7, claim 4, line 67, after "carriage" insert --and--.

Signed and Sealed this

Twenty-first Day of August, 1990

Attest:

HARRY F. MANBECK, JR.

*Attesting Officer*     *Commissioner of Patents and Trademarks*